United States Patent
Kurita et al.

(10) Patent No.: US 7,181,923 B2
(45) Date of Patent: Feb. 27, 2007

(54) INVERTER DEVICE

(75) Inventors: Yoshiaki Kurita, Shimizu (JP);
Kuniaki Takatuka, Fujieda (JP);
Tatsuo Ando, Shimizu (JP); Noriaki Yamada, Shimizu (JP); Satoshi Furusawa, Shimizu (JP)

(73) Assignee: Hitachi, Ltd., Tokyo (JP), for the benefit of Hitachi Air Conditioning System Co., Ltd. Tokyo, JPX ( * ) Notice: Subject to any disclaimer, the term of this patent is extended or adjusted under 35 U.S.C. 154(b) by 266 days.

(21) Appl. No.: 10/832,297

(22) Filed: Apr. 27, 2004

(65) Prior Publication Data

US 2004/0194486 A1 Oct. 7, 2004

Related U.S. Application Data

(63) Continuation of application No. 10/396,385, filed on Mar. 26, 2003, now Pat. No. 6,735,968.

(30) Foreign Application Priority Data

Mar. 29, 2002 (JP) .............................. 2002-093559
Jul. 17, 2002 (JP) .............................. 2002-207673

(51) Int. Cl.
*F25D 25/00* (2006.01)

(52) U.S. Cl. .................................... 62/228.4; 62/259.2

(58) Field of Classification Search .............. 62/228.1, 62/228.3, 228.4, 215, 230, 259.2; 363/37, 363/40, 41, 42, 43, 95, 96, 97, 98, 131, 132, 363/133, 134, 141; 361/735; 712/36
See application file for complete search history.

(56) References Cited

U.S. PATENT DOCUMENTS

| | | | | |
|---|---|---|---|---|
| 5,497,289 A | * | 3/1996 | Sugishima et al. ........... 363/37 |
| 5,949,663 A | * | 9/1999 | Endo et al. .................... 363/40 |
| 6,115,270 A | * | 9/2000 | Yamane et al. ............. 363/141 |
| 6,320,776 B1 | * | 11/2001 | Kajiura et al. .............. 363/141 |
| 6,333,928 B1 | | 12/2001 | Schaal et al. |
| 6,597,582 B2 | | 7/2003 | Baba |

FOREIGN PATENT DOCUMENTS

CN    20-0199511    2/2000

(Continued)

*Primary Examiner*—Cheryl Tyler
*Assistant Examiner*—Gene Bankhead
(74) *Attorney, Agent, or Firm*—Antonelli, Terry, Stout and Kraus, LLP.

(57) ABSTRACT

An inverter device for variably controlling an operating frequency of an electric motor, which drives a compressor in a refrigerating cycle. the inverter includes a box-like resin case, having a metal film for shielding being applied or plated on a surface thereof and having a step portion on which a terminal block for the motor is arranged. A first substrate having mounted thereon power semiconductor devices constituting a converter and an inverter so as to be immersed in gel, and the first substrate is mounted in the case and brought into proximity of radiation fins at a reverse surface thereof. A second substrate having mounted thereon interface connectors into which signals from detection sensors for temperatures and pressures in the refrigerating cycle are input and photo-couplers for transmitting the input signals, and the second substrate is mounted in the case above the first substrate.

4 Claims, 4 Drawing Sheets

FOREIGN PATENT DOCUMENTS

| | | |
|---|---|---|
| JP | 6-123449 | 5/1994 |
| JP | 6-165527 | 6/1994 |
| JP | 8-182346 | 7/1996 |
| JP | 11-041943 | 2/1999 |
| JP | 2001-289549 | 10/2001 |

* cited by examiner

… … … US 7,181,923 B2

INVERTER DEVICE

CROSS REFERENCE TO RELATED APPLICATION

This is a continuation of U.S. application Ser. No. 10/396,385, filed Mar. 26, 2003, now U.S. Pat. No. 6,735,968, the subject matter of which is incorporated by reference herein.

BACKGROUND OF THE INVENTION

The present invention relates to a refrigerating apparatus having a compressor motor, an operating frequency of which can be variably controlled, and an inverter device used in the refrigerating apparatus.

Conventionally, in order to facilitate modification of specification without modifying an inverter basic unit, it has been known from, for example, JP-A-11-41943, that an inverter basic unit and an I/O block unit are separated from each other, wherein the inverter basic unit comprises a first substrate on which a converter for converting an alternating current voltage from an alternating current power source to a direct current, and an inverter being a DC/AC converter are mounted, a second substrate on which a controller including a microcomputer for controlling the inverter is mounted, and a third substrate on which a terminal block, a rush suppressing resistor, and a smoothing capacitor are mounted, and wherein the I/O block unit controls an input/output interface among a microcomputer processing for controlling an inverter control device.

The above conventional art increases freedom of modification of specification but takes no account of application, in particular, to a refrigerating cycle. Therefore, a problem peculiar to the refrigerating cycle, that is, taking into a microcomputer signals from detection sensors for various temperatures and pressures in the refrigerating cycle to perform an inverter control suited to the refrigerating cycle is not taken into consideration, and a demand for miniaturization of a refrigerating apparatus itself is not adequately taken into consideration.

An object of the present invention is to achieve miniaturization of an air conditioner and a refrigerating apparatus such as a refrigerating machine, in particular, miniaturization of the refrigerating apparatus and an inverter device accompanied with miniaturization of an outdoor unit, and to improve reliability in a refrigerating cycle, and to make a refrigerating apparatus more suitable for high degree control and fault diagnosis.

BRIEF SUMMARY OF THE INVENTION

A refrigerating apparatus having a refrigerating cycle provided with a compressor which is driven by an electric motor, an operating frequency of which is variably controlled, according to the present invention comprises: a first substrate on which an active converter, which use an active element to convert an alternating current voltage from an alternating current power source into a direct current, and an inverter for converting the generated direct current into an alternating current to drive the electric motor, the first substrate having a radiation fin closely adhered to a reverse surface to a mounting surface thereof; a second substrate on which a microcomputer for controlling the active converter and the inverter, a current detecting mechanism for detecting an electric current of the electric motor, and a terminal block of the electric motor are mounted; a casing covering sides of the first and second substrates and having a front surface provided with a step permitting the terminal block to be arranged thereon; and a third substrate on which an interface connector, into which signals from detection sensors for various temperatures and pressures in the refrigerating cycle are input, and a photo-coupler for transmitting the input signals to the microcomputer by means of optical signals are mounted; and wherein the terminal block is adapted to the step, the first substrate, the second substrate, and the third substrate are layered in this order on a bottom surface of the casing, gel is filled up to a power semiconductor surface of the first substrate, and a resin is filled up to an upper surface of the second substrate from the gel surface.

Further, it is desired in the above refrigerating apparatus that first lead pins connecting the first substrate with the second substrate, and second lead pins connecting the first substrate with the third substrate be provided toward a side of the casing, and the second substrate and the third substrate be connected together by third lead pins provided on the second substrate.

Further, it is desired in the above refrigerating apparatus that the operating frequency be output via the interface connector.

Further, it is desired in the above refrigerating apparatus that at least one of a signal of a discharge gas temperature and a signal of a discharge gas pressure of the compressor be input via the interface connector.

Further, the invention provides a refrigerating apparatus having a refrigerating cycle provided with a compressor, the compressor being driven by an electric motor, an operating frequency of which is variably controlled, the refrigerating apparatus comprising: a first substrate on which an inverter for converting a direct current into an alternating current to drive the electric motor, and having a radiation fin closely adhered to a reverse surface to a mounting surface thereof; an active converter externally mounted to the first substrate to use an active element to convert an alternating voltage from an alternating current power source into a direct current; a second substrate on which a microcomputer for controlling the inverter and the active converter, a current detecting mechanism for detecting an electric current of the electric motor, a terminal block of the electric motor, and an interface connector permitting the microcomputer to output a drive signal to the active converter are mounted; a casing covering sides of the first and second substrates and having a front surface provided with a step permitting the terminal block to be arranged thereon; and a third substrate on which an interface connector, into which signals from detection sensors for various temperatures and pressures in the refrigerating cycle are input, and a photo-coupler for transmitting the input signals to the microcomputer by means of optical signals are mounted; and wherein the terminal block is adapted to the step, the first substrate, the second substrate, and the third substrate are layered in this order on a bottom surface of the casing, gel is filled up to a power semiconductor surface of the first substrate, and a resin is filled up to an upper surface of the second substrate from the gel surface.

Further, the invention provides an inverter device for variably controlling an operating frequency of an electric motor, which drives a compressor in a refrigerating cycle, the inverter device comprising: a first substrate on which an active converter, which uses an active element to convert an alternating voltage from an alternating current power source into a direct current, and an inverter for converting the generated direct current into an alternating current to drive the electric motor are mounted, the first substrate having a radiation fin closely adhered to a reverse surface to a mounting surface thereof; a second substrate on which a microcomputer for controlling the active converter and the inverter, a current detecting mechanism for detecting an electric current of the electric motor, and a terminal block of the electric motor are mounted; a casing covering sides of the first and second substrates and having a front surface provided with a step permitting the terminal block to be arranged thereon; and a third substrate on which an interface connector, into which signals from detection sensors for various temperatures and pressures in the refrigerating cycle are input, and a photo-coupler for transmitting the input signals to the microcomputer by means of optical signals are mounted; and wherein the terminal block is adapted to the step, the first substrate, the second substrate, and the third substrate are layered in this order on a bottom surface of the casing, gel is filled up to a power semiconductor surface of the first substrate, and a resin is filled up to an upper surface of the second substrate from the gel surface.

Further, it is desired in the above inverter device that at least one of a signal of a discharge gas temperature and a signal of a discharge gas pressure of the compressor be input via the interface connector.

Further, the invention provides an inverter device for variably controlling an operating frequency of an electric motor, which drives a compressor in a refrigerating cycle, the inverter device comprising: a first substrate on which an inverter for converting a direct current into an alternating current to drive the electric motor is mounted, and having a radiation fin closely adhered to a reverse surface to a mounting surface thereof; an active converter externally mounted to the first substrate to use an active element to convert an alternating voltage from an alternating current power source into a direct current; a second substrate on which a microcomputer for controlling the inverter and the active converter, a current detecting mechanism for detecting an electric current of the electric motor, a terminal block of the electric motor, and an interface connector permitting the microcomputer to output a drive signal to the active converter are mounted; a casing covering sides of the first and second substrates and having a front surface provided with a step permitting the terminal block to be arranged thereon; and a third substrate on which an interface connector, into which signals from detection sensors for various temperatures and pressures in the refrigerating cycle are input, and a photo-coupler for transmitting the input signals to the microcomputer by means of optical signals are mounted; and wherein the terminal block is adapted to the step, the first substrate, the second substrate, and the third substrate are layered in this order on a bottom surface of the casing, gel is filled up to a power semiconductor surface of the first substrate, and a resin is filled up to an upper surface of the second substrate from the gel surface.

Other objects, features and advantages of the invention will become apparent from the following description of the embodiments of the invention taken in conjunction with the accompanying drawings.

DETAILED DESCRIPTION OF THE INVENTION

An embodiment of the invention will be described below with reference to the drawings.

Figure 1:
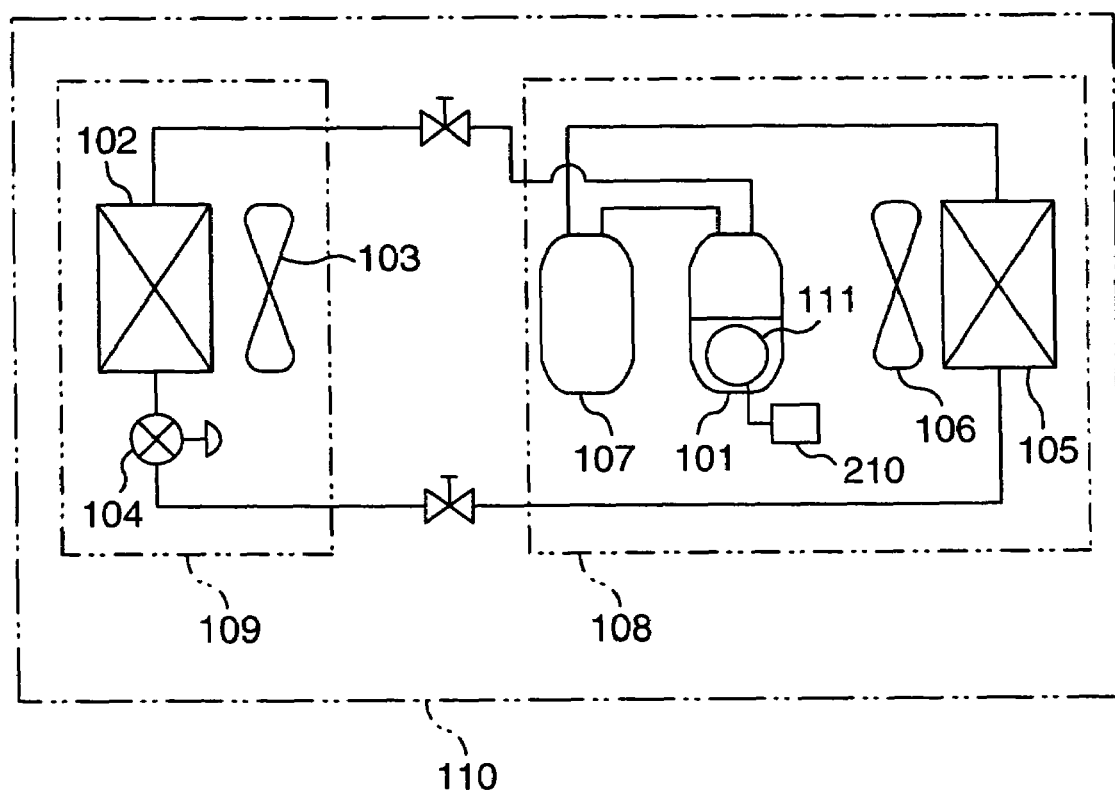
FIG. 1 is a view showing a refrigerating cycle of a refrigerating apparatus according to an embodiment of the invention.

FIG. 1 is a view showing a refrigerating cycle system, in which a compressor 101, an indoor heat exchanger 102, an indoor expansion valve 104, an outdoor heat exchanger 105, and an accumulator 107 are successively connected to permit a refrigerant to circulate therethrough, thus forming a refrigerating cycle. When a room is to be cooled, a refrigerant having been compressed by the compressor 101 is condensed in the outdoor heat exchanger 105 to be liquefied, and then decompressed by the indoor expansion valve 104 to be evaporated in the indoor heat exchanger 102 to be returned to the compressor 101. An electric motor 103 for an indoor fan accelerates heat exchange in an indoor unit 109, and an electric motor 106 for an outdoor fan accelerates heat exchange in an outdoor unit 108.

The compressor 101 is driven by an electric motor 111, an operating frequency of which is variably controlled in relation to a capacity required for the refrigerating cycle, and the operating frequency is controlled by an inverter device 210.

In the refrigerating cycle, an opening degree of the indoor expansion valve 104 or of an outdoor expansion valve (not shown) for regulating a flow rate of the refrigerant, the number of revolutions of the electric motor 103 for the indoor fan and the electric motor 106 for the outdoor fan, a four-way valve (not shown) for switching of operating modes for cooling/heating, and the like in addition to the number of revolutions of the compressor 101 are controlled. As information for the control, an operation command signal from a remote control, which sets an operating mode and temperature, signals of detection of temperatures and pressures of respective parts (discharged gas temperature and suction temperature of the compressor, temperature of heat exchangers, or the like), and so on are input into a control device. Additionally, operating data (for example, temperature of main parts in the refrigerating cycle, suction pressure, discharge pressure, temperature of the compressor, opening degree of the expansion valve of the outdoor unit, opening degree of the expansion valve of the indoor unit, current value of the compressor, frequency of the compressor, outside air temperature, evaporating temperature, suction temperature, blowoff temperature, freezing point, required frequency, gas pipe temperature, set temperature, or the like) of a refrigerating apparatus or an air conditioner are input or output through an interface connector 242 (FIG. 2).

Figure 2:
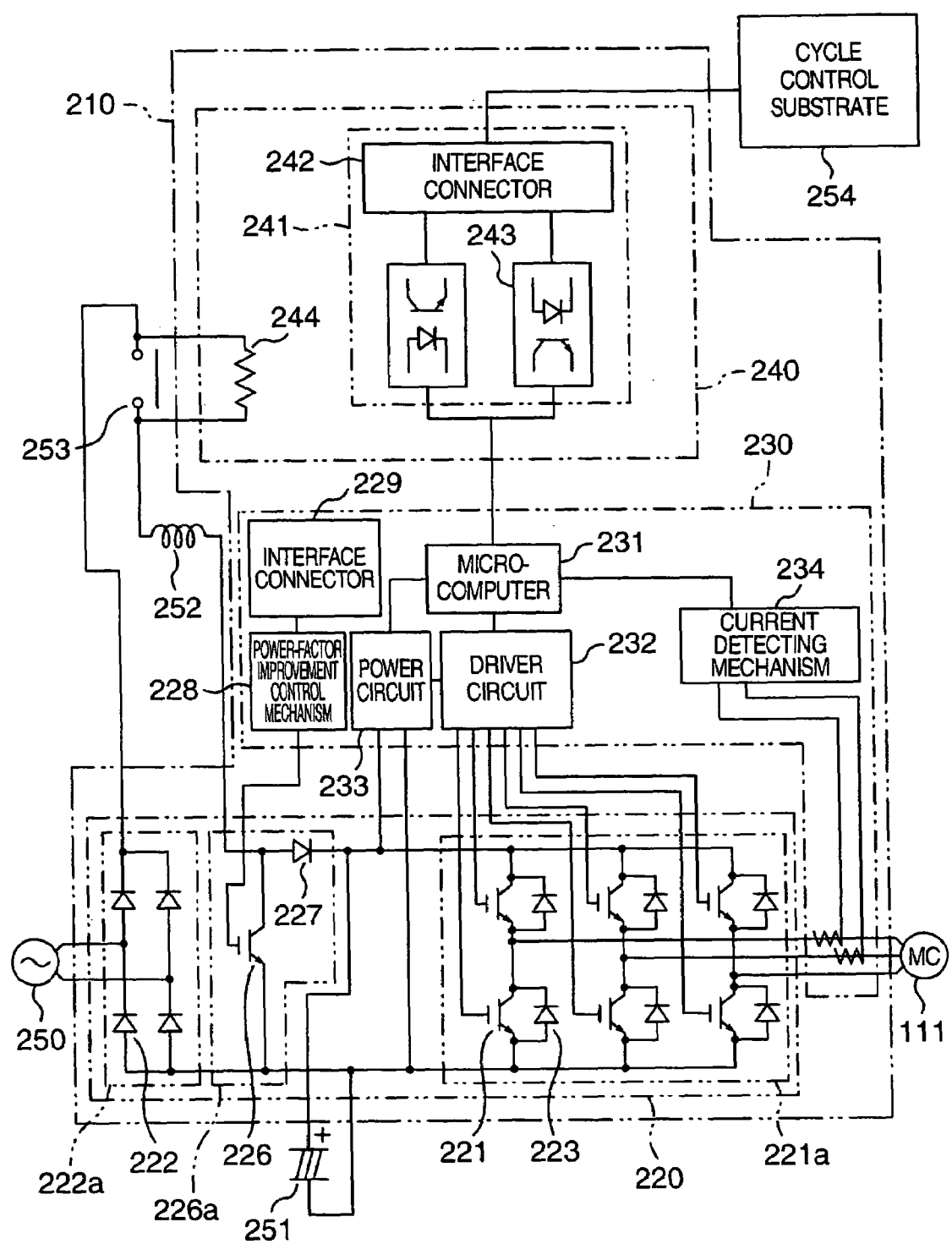
FIG. 2 is a block diagram of an inverter device according to the embodiment of the invention.

FIG. 2 is a circuit diagram of the inverter device, and the circuit is structured by a first substrate (metallic substrate) 220, a second substrate 230, and a third substrate 240. Mounted on the first substrate 220 are a converter 222a for converting an alternating voltage from a single-phase alternating current power source 250 into a direct current, and an active converter 226a for converting an alternating voltage from an alternating current power source into a direct current with the use of a switching power element such as transistor module, and for achieving power-factor improvement, reduction in higher harmonics, control of direct current voltage, and so on, and an inverter 221a which is an DC/AC converter. A radiation fin of aluminum is closely mounted on a reverse surface to a mounting surface of the first substrate. Mounted on the second substrate (control substrate) 230 are a microcomputer 231, current detecting mechanism 234 for detecting an electric current of the electric motor 111, control mechanism 228 for driving the active circuit, and a terminal block of the electric motor 111. Mounted on the third substrate 240 are a rush suppressing resistor 244 for suppressing a rush current into the electric motor 111, interface connector 242, into which signals from detection sensors for various temperatures and pressures in the refrigerating cycle are input, and a photo-coupler 243 for transmitting the input signals to the microcomputer 231 by means of optical signals. A smoothing capacitor 251 is externally mounted to the first substrate 220.

An AC voltage from the alternating current power source 250 is made into a direct current by a plurality of bridge-connected rectifying devices 222, the active circuit 226a (a switching element 226 is arranged between a secondary side (+) line of a reactor 252 and an output side (−) line of the converter 222a) achieves power-factor improvement, and an AC frequency of the inverter 221a (power conversion means comprising three-phase bridge-connected switching element 221) which is an DC/AC converter is controlled by the microcomputer 231 to drive the electric motor 111.

In the converter 222a, an AC voltage is rectified by the plurality of rectifying devices 222 to lead to the smoothing capacitor 251 via a magnet switch 253 for running or stopping the compressor 101, the reactor 252 for power-factor, the switching element 226 of the active circuit, and a fast recovery element 227. Flywheel elements 223 for regenerating a counter-electromotive force generated from the electric motor 111 at the time of switching are provided on the inverter 221a to be arranged side by side with the switching element 221, and the both elements are mounted on the first substrate 220.

A driver circuit 232 is provided between the microcomputer 231 and the switching elements 221 to be able to amplify a weak signal from the microcomputer 231 to a level, on which the switching element 221 can be driven. An electric current supplied to the electric motor 111 is detected by the current detecting mechanism 234 and its signal is taken into the microcomputer 231 to be monitored. In the first substrate 220, a part of the direct current generated by the converter 222a is adjusted to around 5 V from high voltage, which is used in the inverter 221a, by a power circuit 233 provided on the second substrate 230 to be supplied to the microcomputer 231, the driver circuit 232, and the current detecting mechanism 234.

Also, the power-factor improvement control mechanism 228 provided on the second substrate drivingly controls the active circuit 226a provided on the first substrate. Further, the active circuit may be provided outside the first substrate, in which case the interface connector is arranged on the second substrate. Thereby, it becomes possible to increase a capacity of the active circuit 226a, which makes it easy to accommodate refrigerating apparatuses having a wide range of sizes.

Mounted on the third substrate (interface substrate) 240 is a transmission circuit 241, and provided on the transmission circuit 241 are the interface connector 242, into which signals from detection sensors for various temperatures and pressures in the refrigerating cycle are input, and the photo-coupler 243 for transmitting input signals to the microcomputer 231 by means of optical signals. Signals from detection sensors for various temperatures and pressures in the refrigerating cycle, opening degrees of the indoor expansion valve 104 or of the outdoor expansion valve (not shown) for regulating a flow rate of the refrigerant, the number of revolutions of the electric motor 103 for the indoor fan and the electric motor 106 for the outdoor fan, a control signal of the four-way valve (not shown) for switching of operating modes for cooling/heating, inverter current, inverter frequency, condition signals indicative of abnormality and normality of the inverter itself, and the like are sent and received between a cycle control substrate 254 and the microcomputer 231 via the photo-coupler 243 in a state, in which electric separation is obtained. In particular, the operating frequency of the inverter is output through the photo-coupler 243 and the interface connector 242 to permit grasping an operating condition of the refrigerating cycle, an analysis of a main cause in the case of stoppage and further an analysis of a possible failure. Also, the rush suppressing resistor 244 is provided in parallel to the magnet switch 253 on the third substrate 240 to prevent the magnet switch 253, which is closed at the time of power-on, from being fused by an excessive rush current, which flows to the electrolytic capacitor 251.

The microcomputer 231 required for inverter control, that is, modification of the operating frequency with high-speed switching, is required to operate at high speed. However, microcomputers operating at low speed are serviceable in capacity control in the refrigerating cycle, switching of cooling/heating modes, or the like, and the microcomputer 231 can be made common in controlling various control valves (the outdoor expansion valve, the electric motor 106 for the outdoor fan, the four-way valve for switching of operating modes for cooling/heating) in the refrigerating cycle. In particular, with an arrangement, in which a drive circuit for the outdoor expansion valve is provided on the first substrate 220 so that a signal detecting a discharge gas temperature of the compressor 101 is input into the microcomputer 231 via the interface connector 242, the microcomputer 231 can control the compressor 101 in capacity and a refrigerant flow rate so as to make them optimum whereby the control circuit for the entire refrigerating cycle can be simplified to decrease wiring or the like, thus enabling miniaturization.

Figure 3:
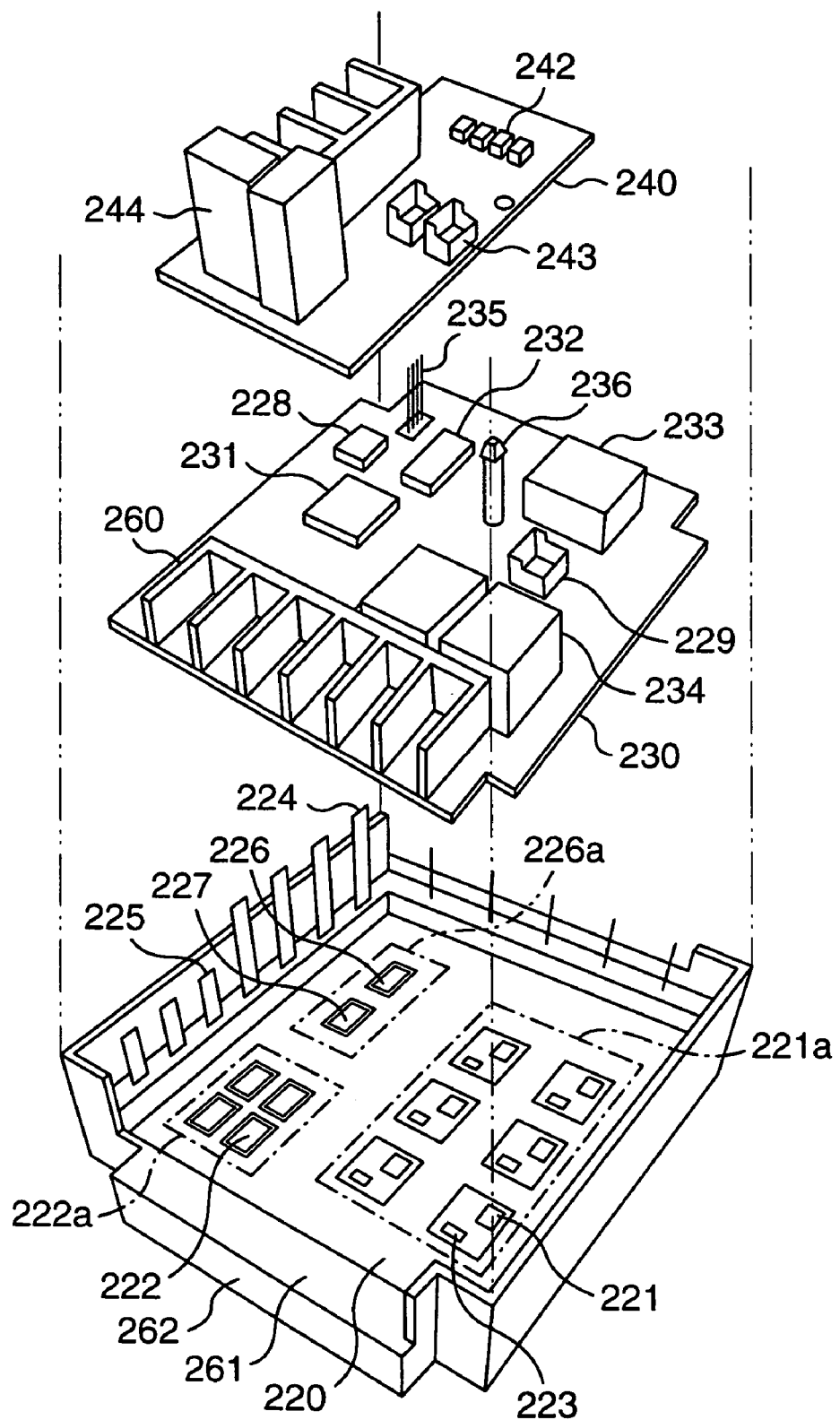
FIG. 3 is a perspective view showing a way to assemble the inverter device according to the embodiment of the invention.
Figure 4:
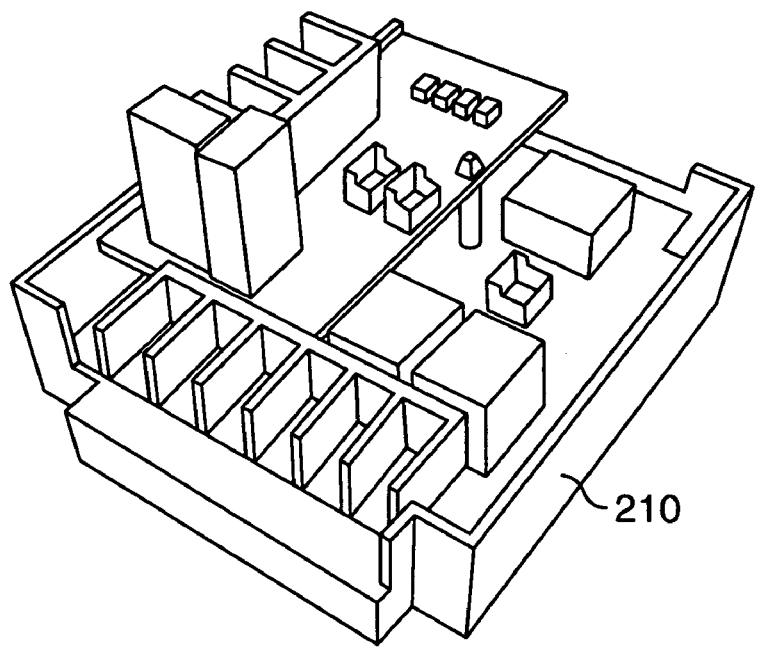
FIG. 4 is a perspective view showing a state, in which the inverter device according to the embodiment of the invention is assembled.
Figure 5:
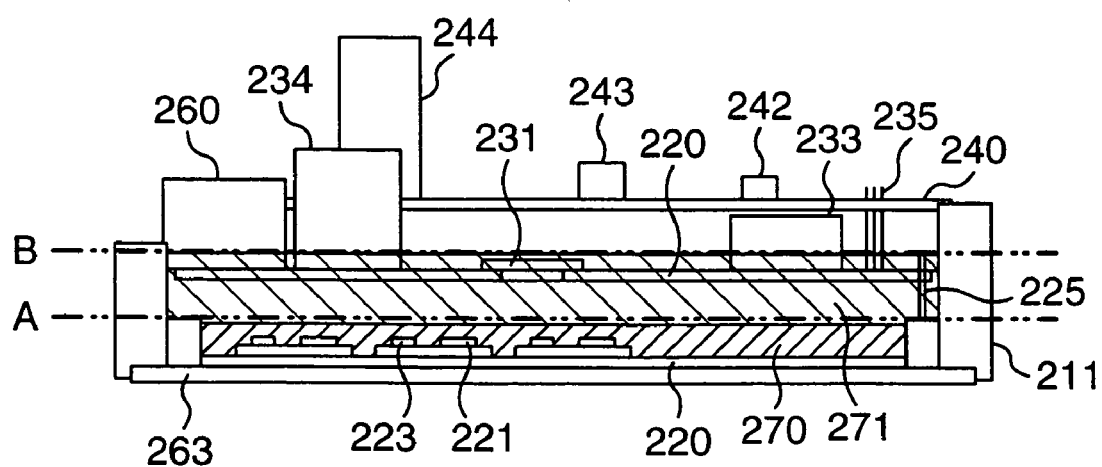
FIG. 5 is a cross sectional view showing the inverter device according to the embodiment of the invention.

FIG. 3 shows a way to assemble the inverter device at the time of mounting, FIG. 4 shows a state, in which the device has been finally assembled, and FIG. 5 shows a cross section of the device. A front surface of a casing 262 is partially cut out to provide a step portion 261 permitting a terminal block 260 to be arranged thereon, and a radiation fin 263 is mounted closely on a reverse surface to that bottom surface, on which mounting is made, to radiate heat generated from the converter 222a, the inverter 221a, and the active circuit 226a.

While the casing 262 may be made of metal such as aluminum die casting, the casing made of a resin affords low cost and a complex shape such that the terminal block 260 can be arranged to be fitted into the step portion 261 and is accordingly prevented from extending above from an upper surface of the casing 262. Accordingly, such arrangement can eliminate a waste space in mounting the inverter device on, for example, an outdoor unit of an air conditioner, and is also desirable in suppressing electromagnetic noise. Further, the first substrate 220, the second substrate 230, and the third substrate 240 are layered in this order on the bottom surface of the casing 262, and these substrates are received in the casing 262. Also, gel 270 is filled up to substantially an alternate long and short dash line A on a power semiconductor surface of the first substrate 220 to protect power semiconductor devices (diodes and IGBTs, which constitute the converter 222a, the inverter 221a, and the active circuit 226a). Further, a resin 271 is filled up to substantially an alternate long and two short dashes line B, that is, an upper surface of the second substrate 230 from the gel surface as shown in FIG. 5 for the purpose of protection and insulation, thus finishing a power module ISPM.

Provided inside the side surfaces of the casing 262 are first lead pins 225 connecting the first substrate 220 with the second substrate 230, and second lead pins 224 connecting the first substrate 220 with the third substrate 240, and the second substrate 230 and the third substrate 240 are connected to each other by third lead pins 235, which are provided on the second substrate 230. Also, the third substrate is supported by a substrate support spacer 236 provided on the second substrate.

As described above, it is possible to achieve reduction of manhour in assembly work and miniaturization of an area, in which parts are mounted, and it is possible to suppress unnecessary radiation electromagnetic noise since the converter 222a, the inverter 221a, and the microcomputer 231, on which power semiconductor devices are mounted, and the current detecting mechanism 234 for detecting an electric current of the electric motor 111 are enclosed by the box-shaped casing 262, which has been subjected to shielding treatment to suppress generation of electromagnetic noise, and the radiating fin.

Also, since the converter 222a, the inverter 221a, and the active circuit 226a are mounted on the same substrate (the first substrate 220), and the first substrate and the second substrate, on which the microcomputer 231 for controlling power semiconductor devices, the current detecting mechanism 234 for detecting an electric current of the electric motor 111, and the terminal block 260 of the electric motor are mounted, are arranged close to each other in a layered manner to be made compact, it is possible to decrease lengths of wiring on those portions, in which noise generates in much possibility, thus enabling decreasing a main cause for generation of noise.

Further, the third substrate 240 is arranged topmost, on which the interface connector 242 is mounted, into which signals from detection sensors for various temperatures and pressures in the refrigerating cycle are input, the signals being comparatively weak ones greatly affected by electromagnetic noise, for example, by the compressor 101 requiring a large current, and the signals are transmitted to the microcomputer 231 by means of optical signals, so that malfunctioning due to mixing of noise is eliminated to enable improving reliability in the refrigerating cycle. Further, since the gel is filled up to the power semiconductor surface of the first substrate 220 and besides the resin is filled up to the upper surface of the second substrate 230 from the gel surface, the power module ISPM itself is also improved in reliability.

Further, when software of the microcomputer 231 and hardware such as the input/output interface are to be modified in accordance with a configuration of a refrigerating cycle, the capacity of a refrigerating apparatus or an air conditioner, and a kind of machines such as multi-machines for stores and buildings, such modification is readily accommodated by separation of the topmost third substrate 240. And countermeasures such as reduction in the number of wirings are increased in freedom also at this time since the substrates are arranged in order of electric current from the bottom surface of the casing 262.

As described above, according to the present invention, a main cause for generation of noise is decreased to enable improving reliability in a refrigerating cycle and to enable higher control, fault diagnosis, or the like since substrates are arranged compact in a layered manner such that a substrate having power semiconductor devices is arranged in a lowermost position, a substrate, on which a microcomputer is mounted, is arranged thereabove, and a substrate, on which an interface connector is mounted, is arranged in a topmost position, and signals from detection sensors for various temperatures and pressures in the refrigerating cycle are transmitted to the microcomputer from the interface connector by means of optical signals.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An inverter device for variably controlling an operating frequency of an electric motor which drives a compressor in a refrigerating cycle, comprising:
   a box-like resin case having a metal film for shielding being one of applied and plated on a surface thereof, and having a step portion on which a terminal block for the motor is arranged;
   a first substrate having mounted thereon power semiconductor devices constituting a converter for converting an alternating voltage from an alternating power source into a direct current and an inverter which is a DC/AC converter so as to be immersed in gel, said first substrate being mounted in said case and being brought into proximity of radiation fins at a reverse surface thereof; and
   a second substrate having mounted thereon interface connectors into which signals from detection sensors for temperatures and pressures in the refrigerating cycle are input and photo-couplers for transmitting the input signals, said second substrate being mounted in said case above said first substrate.

2. An inverter device according to claim 1, wherein a third substrate, on which a microcomputer for controlling the power semiconductor devices is mounted, is arranged between said first substrate and said second substrate.

3. An inverter device according to claim 1, wherein the operating frequency is output through the interface connectors.

4. An inverter device according to claim 1, wherein a microcomputer for controlling the power semiconductor devices is arranged in said case, and the microcomputer and the power semiconductor devices are surrounded by said case and the radiation fins.

* * * * *